US008325994B2

(12) United States Patent
Davida

(10) Patent No.: US 8,325,994 B2
(45) Date of Patent: Dec. 4, 2012

(54) SYSTEM AND METHOD FOR AUTHENTICATED AND PRIVACY PRESERVING BIOMETRIC IDENTIFICATION SYSTEMS

(76) Inventor: George I. Davida, Milwaukee, WI (US)

(*) Notice: Subject to any disclaimer, the term of this patent is extended or adjusted under 35 U.S.C. 154(b) by 0 days.

(21) Appl. No.: 13/158,586

(22) Filed: Jun. 13, 2011

(65) Prior Publication Data
US 2011/0302420 A1 Dec. 8, 2011

Related U.S. Application Data

(63) Continuation-in-part of application No. 12/757,175, filed on Apr. 9, 2010, now Pat. No. 7,961,915, which is a continuation of application No. 09/303,053, filed on Apr. 30, 1999, now Pat. No. 7,711,152.

(51) Int. Cl.
G06K 9/00 (2006.01)
(52) U.S. Cl. ....... 382/115; 713/186; 340/5.53; 340/5.83
(58) Field of Classification Search .......... 382/115–127; 340/5.1, 5.2, 5.52, 5.53, 5.8–5.86; 713/186
See application file for complete search history.

(56) References Cited

U.S. PATENT DOCUMENTS

| 4,876,608 A | 10/1989 | Eaton |
| 4,879,747 A | 11/1989 | Leighton et al. |
| 4,935,962 A | 6/1990 | Austin |
| 4,993,068 A | 2/1991 | Piosenka et al. |
| 4,995,081 A | 2/1991 | Leighton |
| 5,151,583 A | 9/1992 | Tokunaga |
| 5,291,560 A | 3/1994 | Daugman |
| 5,404,163 A | 4/1995 | Kubo |
| 5,434,917 A | 7/1995 | Naccache et al. |
| 5,534,855 A | 7/1996 | Shockley |
| 5,541,994 A | 7/1996 | Tomko et al. |
| 5,572,596 A | 11/1996 | Wildes |
| 5,659,616 A | 8/1997 | Sudia |
| 5,668,897 A | 9/1997 | Stolfo |
| 5,680,460 A | 10/1997 | Tomko et al. |
| 5,721,781 A | 2/1998 | Deo |
| 5,745,900 A | 4/1998 | Burrows |
| 5,790,668 A | 8/1998 | Tomko |
| 5,802,199 A | 9/1998 | Pare, Jr. |
| 5,805,712 A | 9/1998 | Davis |
| 5,825,871 A | 10/1998 | Mark |
| 5,841,888 A | 11/1998 | Setlak |
| 5,845,005 A | 12/1998 | Setlak |
| 5,869,822 A | 2/1999 | Meadows, II |

(Continued)

OTHER PUBLICATIONS

Canetti, "Towards Realizing Random Oracles: Hash Functions that Hide all Partial Information," Advances in Cryptology, 1997, p. 455-469.

(Continued)

Primary Examiner — Aaron W Carter
(74) Attorney, Agent, or Firm — Lesavich HIgh-Tech Law Group, P.C.

(57) ABSTRACT

A biometric based identification and authorization for a collected physical biometric for a security infrastructure is presented. The biometric identification and authorization is achieved with an identity verification template (IVT) generated from a User Biometric (UB) collected from a human or non-human object and stored on an biometric storage device (e.g., a magnetic strip card, smart card, Universal Serial Bus (USB) flash drive or a Radio Frequency Identifier (RFID) device, etc.). The generated UB is discarded. The IVT does not contain complete information from the UB but allows for accurate verification of the human or non-human object when another UB is generated for the human or non-human object at a later time.

17 Claims, 7 Drawing Sheets

U.S. PATENT DOCUMENTS

| | | |
|---|---|---|
| 5,910,988 A | 6/1999 | Balard |
| 6,016,476 A | 1/2000 | Maes et al. |
| 6,035,398 A | 3/2000 | Bjorn |
| 6,038,315 A | 3/2000 | Strait et al. |
| 6,181,803 B1 | 1/2001 | Davis |
| 6,202,151 B1 | 3/2001 | Musgrave |
| 6,256,737 B1 | 7/2001 | Bianco |
| 6,289,113 B1 | 9/2001 | McHugh |
| 6,309,069 B1 | 10/2001 | Seal et al. |
| 6,324,271 B1 | 11/2001 | Sawyer |
| 6,505,193 B1 | 1/2003 | Musgrave |
| 6,507,912 B1 | 1/2003 | Matyas, Jr. et al. |
| 7,269,277 B2 | 9/2007 | Davida et al. |
| 7,711,152 B1 | 5/2010 | Davida et al. |
| 7,961,915 B2 | 6/2011 | Davida |
| 2001/0034836 A1 | 10/2001 | Matsumoto |
| 2001/0049785 A1 | 12/2001 | Kawan |
| 2002/0070844 A1 | 6/2002 | Davida et al. |
| 2010/0194530 A1 | 8/2010 | Davida et al. |
| 2011/0208710 A1 | 8/2011 | Lesavich |

OTHER PUBLICATIONS

Davida et al., "On Enabling Secure Applications Through Off-line Biometric Identification," IEEE Security and Privacy, May 1998, p. 148-157.

Davida et al., "On the Relation of Error Correction and Cryptography to an Off line Biometric Based Identification Scheme," Nov. 29, 1998, p. 1-10.

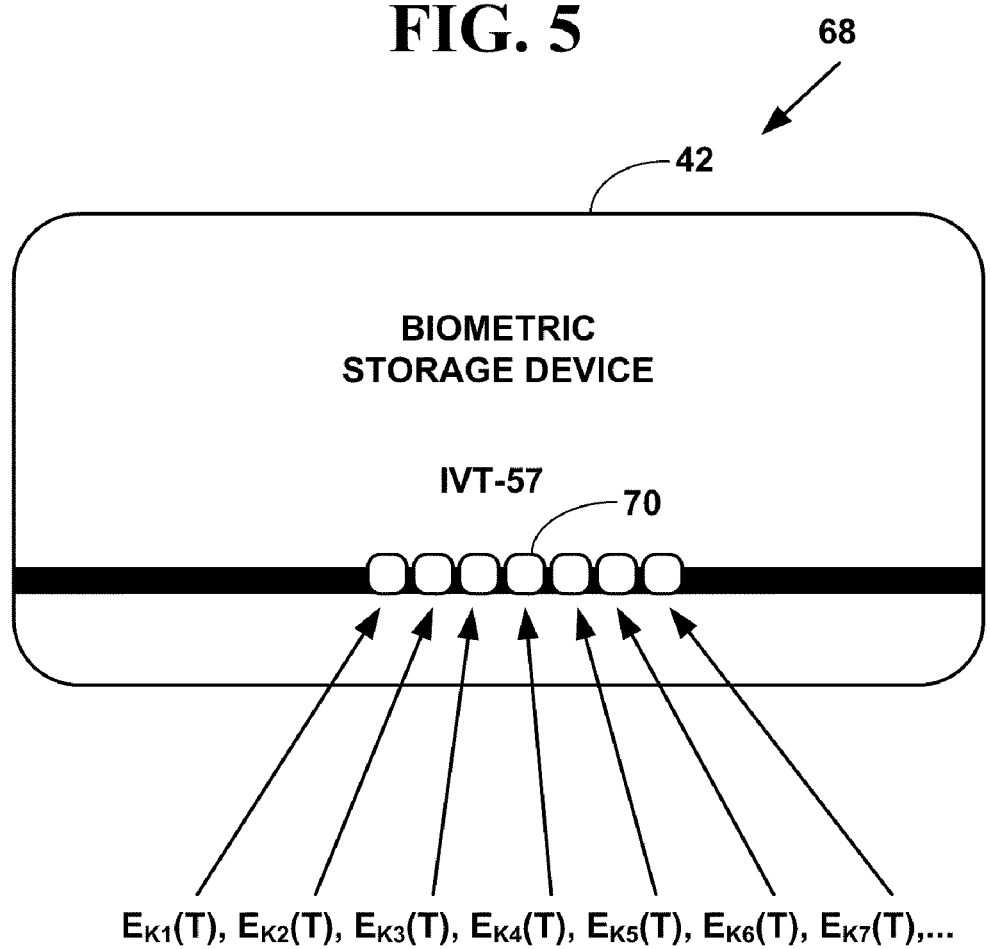

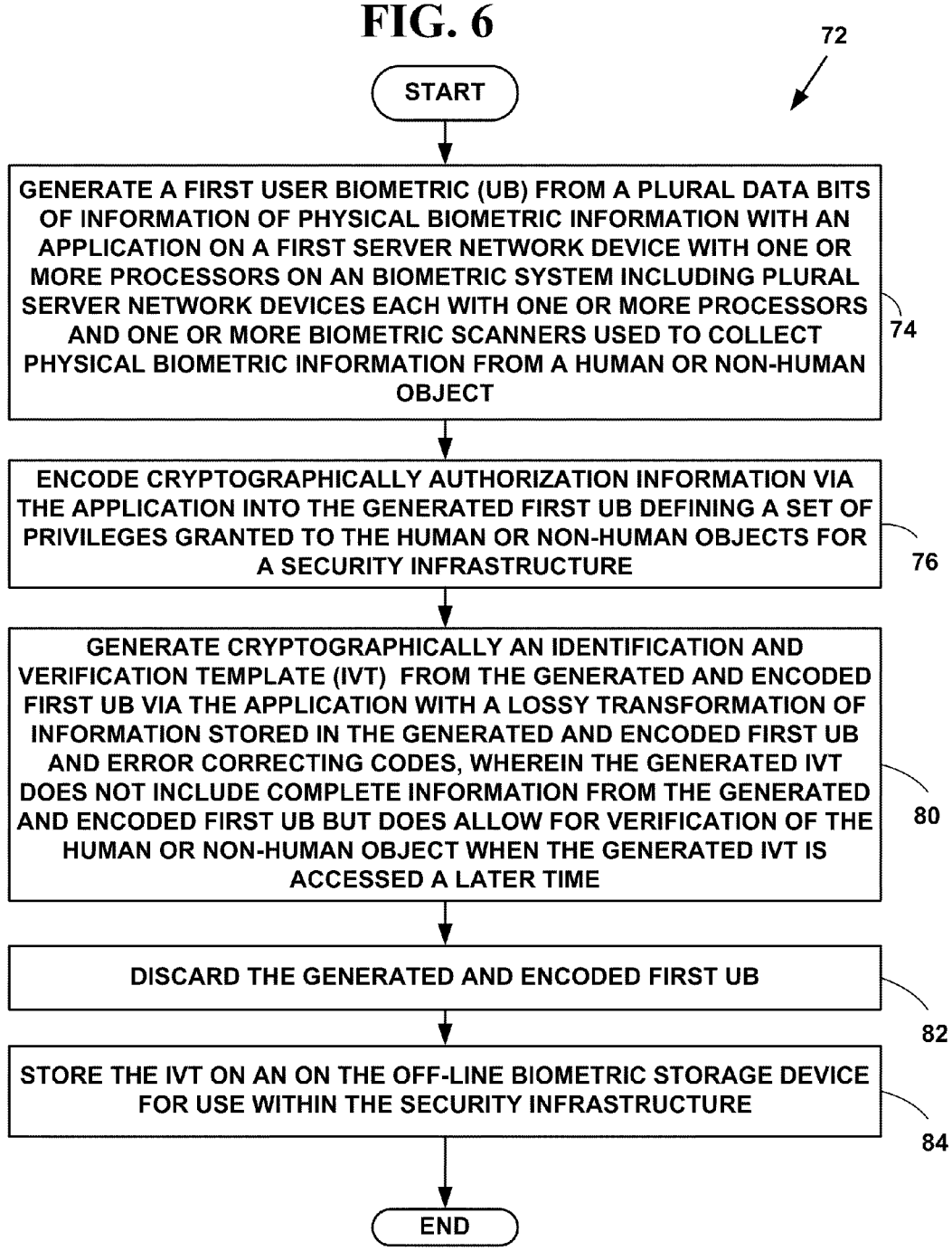

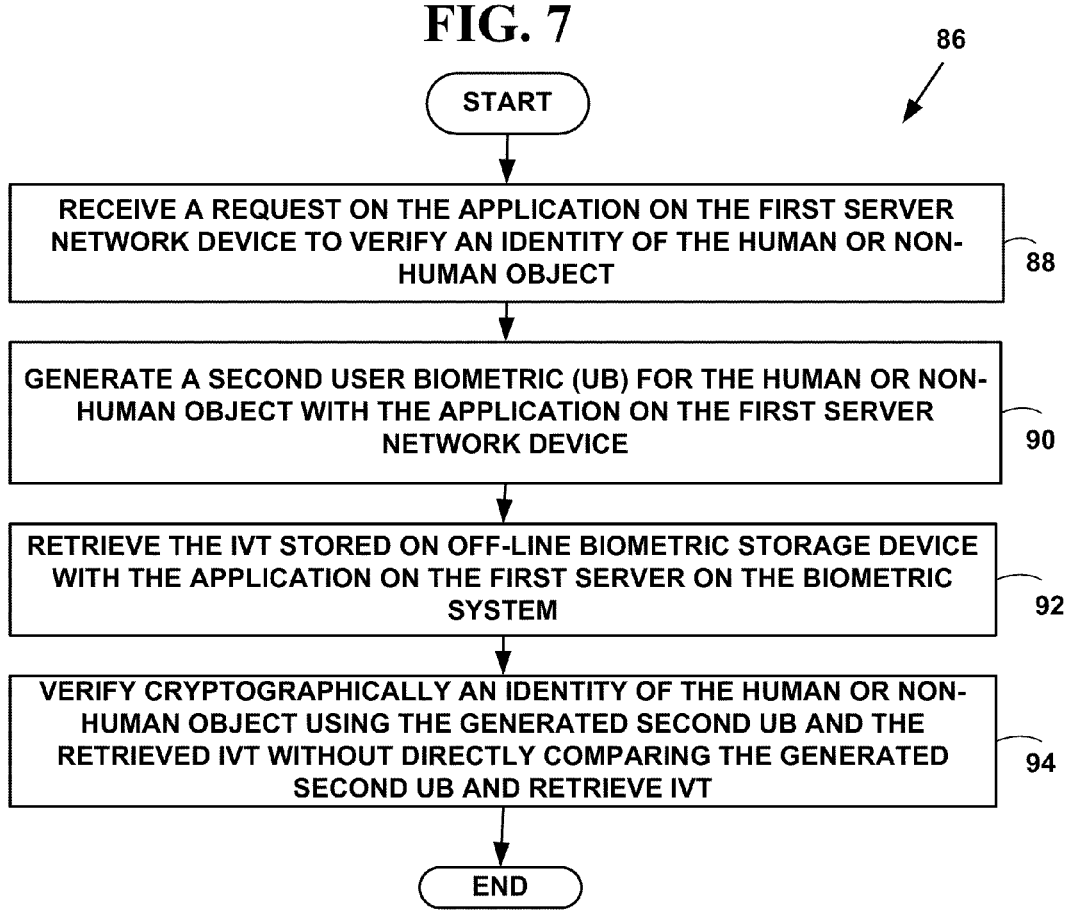

US 8,325,994 B2

SYSTEM AND METHOD FOR AUTHENTICATED AND PRIVACY PRESERVING BIOMETRIC IDENTIFICATION SYSTEMS

CROSS-REFERENCES TO RELATED APPLICATIONS

This application is a Continuation-In-Part (CIP) of U.S. patent application Ser. No. 12/757,175 filed on Apr. 9, 2010, that issued as U.S. Pat. No. 7,961,915 on Jun. 14, 2011, which is a Continuation of U.S. patent application Ser. No. 09/303,053 filed Apr. 30, 1999, which issued as U.S. Pat. No. 7,711,152, on May 4, 2010, the contents of all of which are incorporated by reference.

FIELD OF INVENTION

This invention relates to biometrics. More specifically it relates to the identification and authorization of biometric data through pattern recognition.

The present invention is related to the field of identification (authorization), and more specifically to the identification (authorization) of users/objects, and sets of users/objects through pattern recognition and identification. These patterns may be derived from measurements of features of the human body. These patterns may also be derived from measurements of physical features of an object or from patterns applied to an object such as on a label. Patterns derived from physical features (such as fingerprints or iris patterns or facial scan patterns) or emissions (such as voices) of the human body are referred to herein as "biometrics". The present invention finds particular utility in identification of objects and biometric identification of humans.

BACKGROUND OF THE INVENTION

In some conventionally available biometric identification systems, a scan of the iris is used as the biometric identifier. In these conventional systems, a database of the iris scans of individuals is maintained, either on-line or in a portable token such as a card with a magnetic strip on it.

When the user desires access to a secure area, a current iris scan is taken and this current scan is compared to the scan stored on the token or in the database. If the two scans match within some predetermined acceptable limit, the individual is considered authorized and allowed to proceed into the secure area.

One problem with such a system is that the individual's actual iris scan is stored in the on-line database or on the token. If the token is stolen or if the security of the on-line database is compromised, an individual's iris scan is no longer protected.

From a privacy point of view, an iris scan of an individual can reveal certain aspects of the individual's health. Therefore, if someone unauthorized obtains an individual's iris scan, private medical information may become available to unauthorized people.

SUMMARY OF THE INVENTION

A biometric based identification and authorization for a collected physical biometric for a security infrastructure is presented. A biometric based identification and authorization for a collected physical biometric for a security infrastructure is presented. The biometric identification and authorization is achieved with an identity verification template (IVT) generated from a User Biometric (UB) collected from a human or non-human object and stored on an biometric storage device (e.g., a magnetic strip card, smart card, Universal Serial Bus (USB) flash drive or a Radio Frequency Identifier (RFID) device, etc.). The generated UB is discarded. The IVT does not contain complete information from the generated UB but allows for accurate verification of the human or non-human object when another UB is generated for the human or non-human object at a later time.

BRIEF DESCRIPTION OF THE DRAWINGS

Preferred embodiments of the present invention are described with reference to the following drawings, wherein:

FIG. 5 is a block diagram illustrating encrypting a template multiple times under different encryption keys;

FIG. 6 is a flow diagram illustrating a method of biometric identification; and

FIG. 7 is a flow diagram illustrating a method of biometric identification.

DETAILED DESCRIPTION OF THE INVENTION

Figure 1:
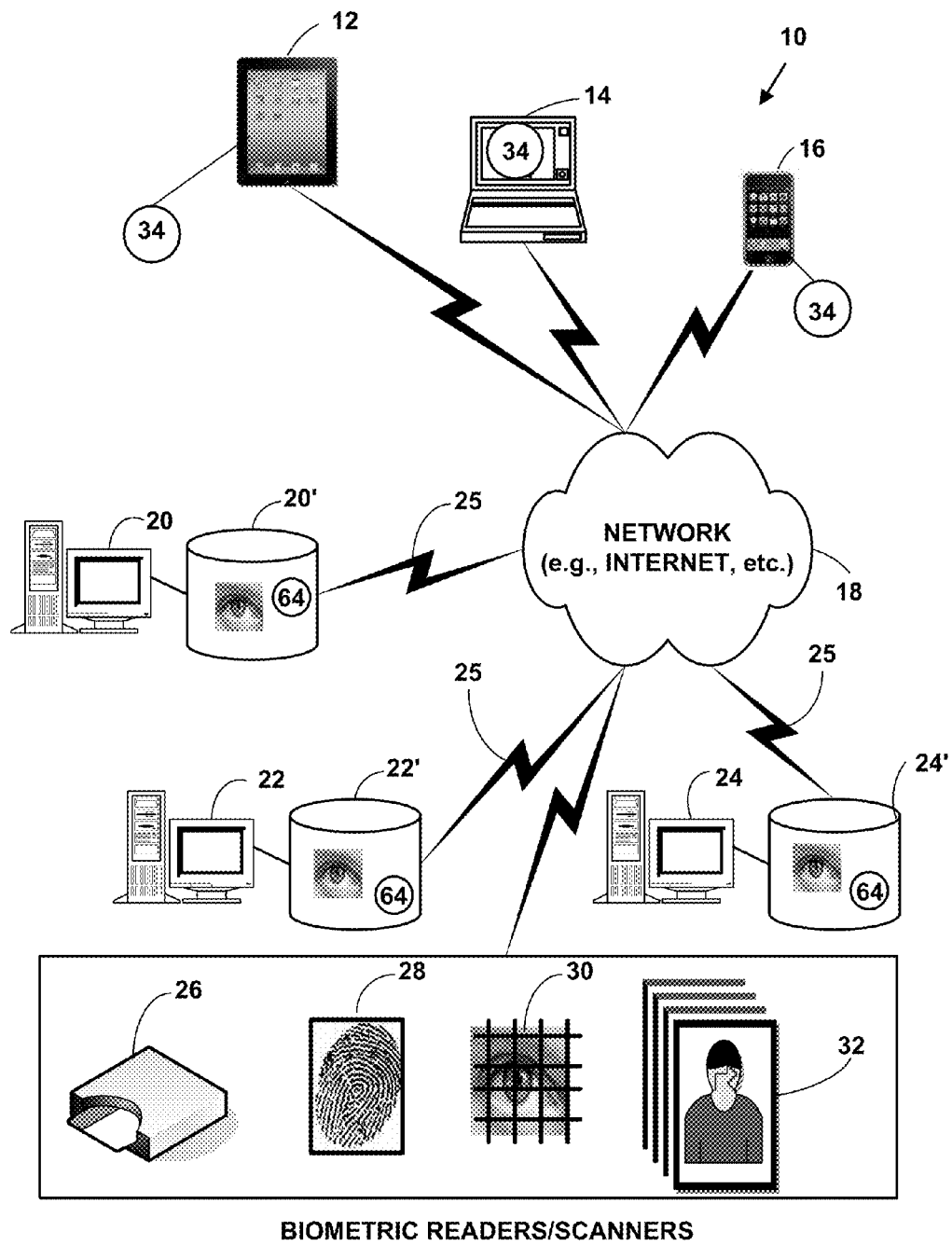
FIG. 1 is a block diagram illustrating an on-line biometric system.

FIG. 1 is a block diagram illustrating an exemplary on-line security system 10. The exemplary on-line security system 10 includes, but is not limited to, one or more target network devices 12, 14, 16 (only three of which are illustrated) each with one more processors. However, the present invention is not limited to these target electronic devices and more, fewer or others types of target electronic devices can also be used.

The target network devices 12, 14, 16 include an application 34. The application 34 includes a software application, hardware application, firmware application and/or any combination thereof.

The one or more target network devices 12, 14, 16 may be replaced with other types of devices including, but not limited to, client terminals in communications with one or more servers, or with personal digital/data assistants (PDA), laptop computers, mobile computers, Internet appliances, two-way pagers, mobile phones, or other similar desktop, mobile or hand-held electronic devices. Other or equivalent devices can also be used to practice the invention.

The one or more client network devices 12, 14, 16 also include smart phones (e.g., 16, etc.) such as the IPHONE by APPLE, Inc., BLACKBERRY STORM and other BLACKBERRY models by RESEARCH IN MOTION, Inc. (RIM), DROID by MOTOROLA, Inc. HTC, Inc. other types of smart phones, other types of mobile and non-mobile phones, etc. However, the present invention is not limited to such devices, and more, fewer or other devices can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as JAVA ME, a smart phone usually allows the user to install and run more advanced applications. Smart phones and/or tablet computers run complete operating system software providing a platform for application developers.

The operating systems include the IPHONE OS, ANDROID, Windows WINDOWS, etc. IPHONE OS is a proprietary operating system for the APPLE, IPHONE Andriod is an open source operating system platform backed by GOOGLE, along with major hardware and software developers (such as INTEL, HTC, ARM, MOTOROLA and Samsung, etc.), that form the Open Handset Alliance.

The one or more client network devices 12, 14, 16 also include tablet computers (e.g., 12, etc.) such as the IPAD, by APPLE, Inc., the HP TABLET, by HEWLETT PACKARD, Inc., the PLAYBOOK, by RIM, Inc., the TABLET, by SONY, Inc. However, the present invention is not limited to such devices, and more, fewer or other devices can be used to practice the invention.

A camera component of a smart phone 16 or tablet computer 12 is used as a biometric scanner and/or biometric reader.

The one or more client network devices 12, 14, 16 may also include a smart phone and/or tablet computer software "application" 34 to interface with the methods described herein.

The target network devices 12, 14, 16 are in communications with a communications network 18. The communications includes, but is not limited to, communications over a wire connected to the target network devices, wireless communications, and other types of communications using one or more communications and/or networking protocols.

Plural server network devices 20, 22, 24 (only three of which are illustrated) each with one or more processors include one or more associated databases 20', 22', 24'. The plural network devices 20, 22, 24 are in communications with the one or more target devices 12, 14, 16 via the communications network 18.

The plural server devices 20, 22, 24, include, but are not limited to, World Wide Web servers, Internet servers, file servers, other types of electronic information servers, and other types of server network devices (e.g., edge servers, firewalls, routers, gateways, switches, etc.).

The plural server network devices 20, 22, 24, may include one or more biometric scanners and/or reader including, but not limited to, smartcard readers/scanners 26, fingerprint scanners 28, eye scanners 30, facial recognition scanners 32, etc. and other devices used to collect biometric or non-biometric information.

The server network devices 20, 22, 24 include an application 64. The application 34 includes a software application, hardware application, firmware application and/or any combination thereof.

The communications network 18 includes, but is not limited to, the Internet, an intranet, a wired Local Area Network (LAN), a wireless LAN (WiLAN), a Wide Area Network (WAN), a Metropolitan Area Network (MAN), a Public Switched Telephone Network (PSTN) and other types of communications networks 18 in which network devices 12, 14, 16, 20, 22, 24, are connected to the communications network 18 with wired and/or wireless interfaces.

The communications network 18 may include one or more gateways, routers, bridges, switches. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments. Switches typically operate at the data link layer and sometimes the network layer therefore support virtually any packet protocol.

The communications network 18 may include one or more servers and one or more web-sites accessible by users to send and receive information useable by the one or more computers 12. The one or more servers, may also include one or more associated databases for storing electronic information.

In one embodiment of the present invention, the wireless interfaces used by the network devices include but are not limited to, an IEEE 802.11a, 802.11b, 802.11g, 802.11n, 802.15.4 (ZigBee), "Wireless Fidelity" (Wi-Fi), "Worldwide Interoperability for Microwave Access" (WiMAX), ETSI High Performance Radio Metropolitan Area Network (HIPERMAN) or "RF Home," or Radio Frequency Identifier (RFID) and other wireless interfaces. In another embodiment of the present invention, the wireless sensor device may include an integral or separate Bluetooth and/or infra data association (IrDA) module for wireless Bluetooth or wireless infrared communications. (not illustrated). However, the present invention is not limited to such an embodiment and other 802.11xx and other types of wireless interfaces can also be used.

As is known in the art, an 802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

As is known in the art, Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the URL "www.weca.net."

As is known in the art, 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the URL "www.ieee802.org" and "www.zigbee.org" respectively.

As is known in the art, WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16 g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16 g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org." ETSI HIPERMAN can be used to provide a WLP.

Recent industry standardization activities from the International Telecommunications Union-Telecommunication Standardization Sector (ITU), ITU-T (www.itu.int/ITU-T/worksem/rfid/program.html) and Institute of Electrical and Electronic Engineers (IEEE), IEEE 1451.7 (www.sensorsportal.com/HTML/standard_7.htm) subcommittee in defining communication methods and data formats for transducers (sensors and actuators) communicating with RFID tags indicated an emerging trend of combining RFID tags into RFID sensors and/or sensor enhanced RFID tags to maximize the use of a wide variety of applications for detection, identification and tracking purposes. These RFID ITU and IEED documents are incorporated herein by reference.

RFID provides a mechanism for tracking and identifying sensing objects and sensors provide information about the condition of the objects. The combination of these two technologies creates great opportunities to provide specialized sensors such as Data, Information and Knowledge (DIaK) sensors and sensor tracking extended services as part of capabilities offered by Integrated Systems Health Management (ISHM) and for use in biometrics.

The communications network 18 includes communications network using the Open Systems Interconnection (OSI) reference model and/or the Internet Protocol (IP) Suite reference model.

As is known in the art, the Open Systems Interconnection (OSI) reference model is a layered architecture that standardizes levels of service and types of interaction for computers exchanging information through a communications network. The OSI reference model separates network device-to-network device communications into seven protocol layers, or levels, each building—and relying—upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

As is known in the art, the Internet Protocol (IP) Suite reference model is the set of communications protocols used for the Internet and other similar data networks. It is named from two of the most important protocols in it: the Transmission Control Protocol (TCP) and the Internet Protocol (IP), which were the first two networking protocols defined in this standard. The Internet Protocol Suite, like many protocol suites, may be viewed as a set of layers. The Internet Protocol suite consists of four layers, from lowest to highest, these are the Link Layer, the Internet Layer, the Transport Layer, and the Application Layer.

The communications network 18 includes, but is not limited to, data networks using the Transmission Control Protocol (TCP), User Datagram Protocol (UDP), Internet Protocol (IP) and other data protocols.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is known in the art, UDP provides a connectionless mode of communications with datagrams in an interconnected set of computer networks. UDP provides a transaction oriented datagram protocol, where delivery and duplicate packet protection are not guaranteed. For more information on UDP see IETF RFC-768, the contents of which incorporated herein by reference.

As is known in the art, IP is an addressing protocol designed to route traffic within a network or between networks. IP is described in IETF Request For Comments (RFC)-791, the contents of which are incorporated herein by reference. However, more fewer or other protocols can also be used on the communications network 18 and the present invention is not limited to TCP/UDP/IP.

An operating environment for the devices of the security system 10 include a processing system with one or more high speed Central Processing Unit(s) ("CPU"), processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It is appreciated that acts and symbolically represented operations or instructions include the manipulation of electrical signals by the CPU or processor. An electrical system represents data bits which cause a resulting transformation or reduction of the electrical signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU or processors.

Preferred embodiments of the present invention include network devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum. However, network devices based on other standards could also be used. IEEE standards can be found on the World Wide Web at the Universal Resource Locator (URL) "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." Bluetooth Forum documents can be found at the URL "www-.bluetooth.com." WAP Forum documents can be found at the URL "www.wapforum.org." ADSL Forum documents can be found at the URL "www.adsl.com."

Security and Encryption

Devices and interfaces of the present invention may include security and encryption for secure communications. Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11x WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the URL "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, IP is an addressing protocol designed to route traffic within a network or between networks. For more information on IP see IETF RFC-791 incorporated herein by reference.

TCP provides a connection-oriented, end-to-end reliable protocol designed to fit into a layered hierarchy of protocols that support multi-network applications. For more information on TCP see RFC-793, incorporated herein by reference.

UDP provides a connectionless mode of communications with datagrams in an interconnected set of networks. For more information on UDP see ITEF RFC-768 incorporated herein by reference.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference. More information on SSL is available at the URL See "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

REFERENCES

Each of the following publications is incorporated herein by reference:

[BR] M. Bellare and R. Rogaway. Random oracles are practical: a paradigm for designing efficient protocols. In Proceedings of the 1st ACM conference on Computers and Communications 20 Security, 1993.

[Berlekamp] E. R. Berlekamp. Algebraic Coding Theory. McGraw-Hill, 1968. [Bouchier96] F. Bouchier, J. S. Ahrens, and G. Wells. Laboratory evaluation of the iris scan prototype biometric identifier. Technical Report SAND96-1033, Sandia National Laboratories USA, April 1996.

[canetti] R. Canetti. Towards realizing random oracles: Hash functions which hide all partial information. In "Advances in Cryptology. Proc. of Crypto'97, pages 455-469, 1997. [Daugman 1]] J. Daugman, Biometric personal identification and system based on IRIS analysis. U.S. Pat. No. 5,291,560

[Daugman2] J. Daugman. High confidence personal identifications by rapid video analysis 30 of iris texture. In IEEE International Carnahan Conference on Security Technology, pages 50-60, 1992.

[Daugman3] J. Daugman. High confidence personal identifications by a test of statistical independence. IEEE Transactions on Pattern Analysis and Machine Intelligence, 15(11): 648-656, November 1993.

[DavidaReddy72] G. I. Davida and S. M. Reddy, "Forward Error Correction with Decision Feedback", Information and Control, 1972, vol. 21.

[Flom] Flom; Leonard and Safir; Aran, Iris recognition system, U.S. Pat. No. 4,641,349:

[Denning] Dorothy E. R. Denning, Cryptography and Data Security, Addision-Wesley, 1982. IEEE Security and Privacy, 1996.

[FeigeFiatShamir88] U. Feige, A. Fiat, and A. Shamir. Zero knowledge proofs of identity. Journal of Cryptology, 1(2):77-94, 1988.

[FIPS140-1] Security requirements for cryptographic modules (FIPS PUB 140-1). Technical Report FIPS140-1, National Institute of Standards and Technology, Gaithersburg, Md., 1994.

[FIPS190] Guideline for the use of advanced authentication technology (FIPS PUB 190). Technical Report FIPS190, National Institute of Standards and Technology, Gaithersburg, Md., 1994.

[Holmes90] J. P. Holmes, R. L. Maxell, and L. J. Wright. A performance evaluation of biometric identification devices. Technical report, Sandia National Laboratories, July 1990.

[MacWilliamsSloane78] F. J. MacWilliams and N. J. A. Sloane. The theory of error—correcting codes. North—Holland Publishing Company, 1978.

U.S. Pat. No. 5,434,917: Unforgeable identification device, identification device reader and method of; 2h!. 20 identification.

[Menezes] A. Menezes, P. Van Oorschot, S. Vanstone. Handbood of applied Cryptography. [Naccache] David Naccache and Patrice Fremanteau, Unforgeable identification device, identification device reader and method of identification, U.S. Pat. No. 5,434,917.

[NaorYung] M. Naor and M. Yung. Universal one-way hash functions and their 25 cryptographic applications. In Proceedings of the 21st Annual ACM Symposium on Theory of Computing}, pages 33-43, 1989.

[PetersonWeldon] W. W. Peterson and E. J. Weldon. Error Correcting Codes. The MIT Press, 1988.

[Pare] Pare, Jr.; David Ferrin, Hoffman; Ned, Lee; Jonathan Alexander, Tokenless biometric 30 ATM access system, U.S. Pat. No. 5,764,789.

[PKCS5] Password-based encryption standard ({PKCS5}). Technical Report PKCS 5, RSA Laboratories, Redwood City, Calif., 1993.

[Shamir86] A. Shamir. Interactive identification, Mar. 23-29, 1986. Presented at the Workshop on Algorithms, Randomness and Complexity, Centre International de Rencontres MathV le}matiques (CIRM), Luminy (Marseille), France.

[Shannon49] C. E. Shannon. A mathematical theory of secrect systems. Bell System 5 Technical Journal}, 28:656-715, 1949.

[SoutarTomko96] C. Soutar and G. J. Tomko. Secure private key generation using a fingerprint. In CardTech/SecurTech Conference Proceedings Vol. 1}, pages 245-252, May 1996.

[Schneier] Bruce Schneier, Applied Cryptography, John Wiley and Sons Indc, (2d ed.), 1996.

[Williams96] G. O. Williams. Iris recognition technology. In IEEE International Carnahan Conference on Security Technology}, pages 46-59, 1996.

[x509] The directory—authentication framework.— X.509, International Telecommunications Union, Geneva, Switzerland, 1993.

[chaum-85] D. Chaum. Security without identification: transaction systems to make big brother obsolete. Communication of the ACM, 28(10):1030-1044, 1985.

[gm84] S. Goldwasser and S. Micali. Probabilistic encryption. Journal of Computer and System Sciences, 28(2):270-299, April 1984.

[Shamir86] A. Shamir. Interactive identification, Mar. 23-29, 1986. Presented at the Workshop on Algorithms, Randomness and Complexity, Centre International de Rencontres MathV {e}matiques (CIRM), Luminy (Marseille), France.

[Shamir84] A. Shamir. Identity-based cryptosystems and signature schemes. In G. R. Blakley and D. Chaum, editors, Advances in Cryptology. Proc. of Crypto'84 (Lecture Notes in Computer Science 196)}, pages 47-53. Springer-Verlag, 1985. Santa Barbara, Calif., U.S.A., August 19-22.

[FIPS 46] FIPS 46, "Data Encryption Standard". Federal Information Processing Publication 46, US Department of Commerce/N.I.S.T., Apr. 17, 1977. (revised as FIPS 46-1, 1988, FIPS 46-2, 1993).

[FIPS 81] FIPS 81, "DES modes of operations". Federal Information Processing Publication 46, US Department of Commerce/N.I.S.T., Apr. 17, 1980.

[FIPS180-1] FIPS180-1, "Secure Hash Standard". Federal Information Processing Publication 180-1, US Department of Commerce/N.I.S.T., Apr. 17, 1995 (supersedes FIPS PUB 180).

[FIPS186] FIPS186, "Digital Signature Standard". Federal Information Processing Publication 186, US Department of Commerce/N.I.S.T., 1994.

[MD5] RFC 1321, "The MD5 Message-digest algorithm", Internet Request for comments 1321, R. L. Rivest, April 1992.

[PEM] RFC 1421, "Privacy enhancement for Internet Electronic Mail—Part I: Message encryption and authentication procedures", Internet Request for Comment 1421, J. Linn, February 1993 (See also RFC 1422, RFC 1423, RFC 1424).

[Rhee] Man Young Rhee, "Error correcting coding theory", McGraw-Hill Communications Series, 1989.

[ShuLin] Shu:Lin, An Introduction to Error correcting Codes, Prentice Hall, 1970.

Off-Line Secure Biometric System

Figure 2:
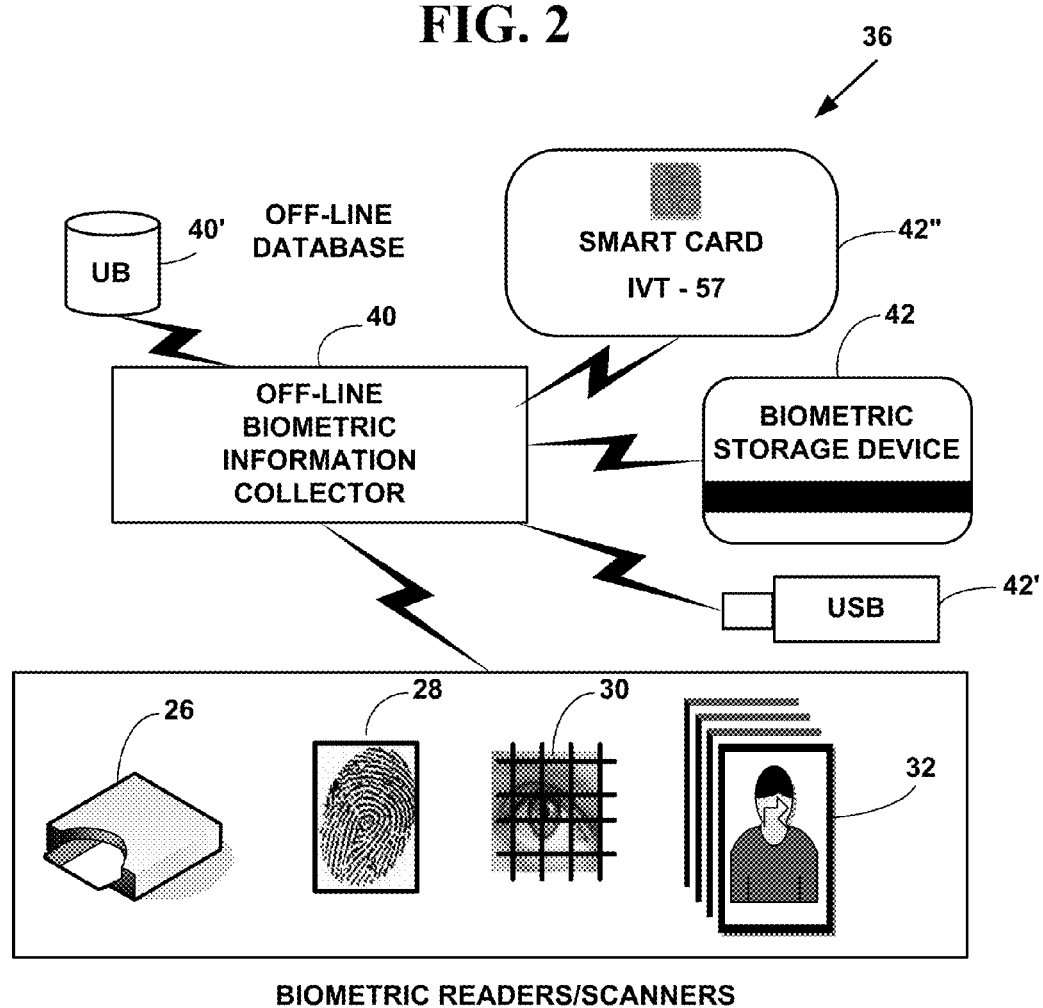
FIG. 2 is a block diagram illustrating an off-line biometric system.

FIG. 2 is a block diagram 36 illustrating an off-line biometric system 38. The off-line biometric system includes a biometric information collector and/or biometric scanner 40 with one or more associated off-line databases 40' to collect biometric information from more smartcard readers 26, fingerprint readers 28, eye scanners 30, facial recognition readers 32, etc. and other devices used to collect biometric or non-biometric information and an off-line biometric storage device 42 (e.g., smartcard, etc.). However, the present invention is not limited to such an embodiment and more, fewer or other types of components may be used in the off-line biometric system 38 to practice the invention.

The present invention will now be explained in detail with reference to its use in secure biometric identification of a human. However, the invention is applicable to a wide range of other biometric pattern identification applications and therefore the following description should not be considered as limiting the invention. The present invention may also be used in any application requiring secure pattern recognition.

Systems for acquisition, storage, and processing of biometrics are known in the art and described in some of the documents which are incorporated by reference into the present application. For simplicity, such systems are not described further in the present application.

In developing secure applications and systems, designers often incorporate secure user identification in the design specification. Secure identification schemes are becoming increasingly important, as more security applications require identification based on physical characteristics rather than solely on a user's knowledge of a secret cryptographic key or password. The increased interest in such applications, ranging from door access to electronic commerce applications, has led to an increased interest in methods for secure and accurate identification of individuals as well as machines and objects. Some of these systems of identification use measurable biological features, called "biometrics," which can be readily measured at the point of application.

It is desirable, though not required, that such measurements be non-invasive and simple to perform. One biometric identification system known in art is an iris scan [See e.g., Bouchier96, Flom, Holmes90, Daugman-1, Daugman-2, Daugman-3, Williams96, etc.] others use retinal, fingerprint, handwriting, face recognition, voice, DNA, etc. Moreover, non-biological objects may also be identified using the biometric technology and we use the term "biometric" in this aspect even though these may not be biological.

The human iris is the colorful doughnut-shaped organ surrounding the pupil, as distinguished from the retina which is the hemispherical organ behind the cornea, lens, iris and pupil. The iris has highly detailed texture and is unique for each individual, differing between identical twins and between left and right eyes of the same individual. It has been determined experimentally that the iris imparts the same or better singularity to individuals as a fingerprint. It is known in the art how to acquire an iris scan of an individual.

For instance methods and apparatus described in Daugman-1 may be used. However, the present invention is not limited to such an embodiment and other embodiments may also be used.

Our working example is based on iris recognition systems. In an iris recognition system a user presents himself/herself to the system, which then acquires a digital or video image[s] of the eye[s]. The system performs image analysis to determine if an iris is visible, the degree of occlusion of the iris by the eyelid, and the degree of spectral reflection; it also assesses the quality of the focus and locates the iris.

The system adjusts for pupillary constriction, overall image size, head tilt and cyclovergence of the eye. The system then proceeds to compute the encoding (scan) for the iris. It is known in the art [Flom, Daugman-1, Daugman-2 Daugman-3] how to generate a digital pattern of the iris using techniques from signal process such as digital filtering and convolution.

In one mechanism for an iris recognition, a scan (pattern) of a user's biometric is stored (and registered) during a user registration method. This user registration includes a registered iris scan or iris code. During identification, a new acquired pattern is compared to a previously registered iris scan. Similar techniques may be used for biometric identification systems which are not based on the iris.

A biometric identification system that stores the biometric in a central database or provides the user's biometric in an unsecured manner may not be acceptable to a user, because a user's biometric could be used for unacceptable purposes if the biometric is obtained by an unauthorized individual. A user's biometric can provide information which a user may not want provided readily. For instance, a finger print reading can be used for law enforcement purposes and an eye scan (retinal or iris) may be able to detect medical conditions.

What does not exist in the prior art are methods for protecting a user's biometric on an insecure device or secure use of the biometric in an online system. Such protection may be beneficial if a storage device holding an "identity verification template (IVT)" is lost or stolen.

What is needed are methods specifically designed to reduce chances of disclosure of a user's private biometric data without requiring hardware tokens including methods to hide stored information. An important security system to consider is the case where neither a user or a reader maintains private decryption keys, because it is a scalable solution when the user must have authorization amongst multiple readers and when password protection is inappropriate.

One of the difficulties of prior art is that prior methods are based on a compare operation of two like, or similar, iris scans. That is, during registration, a scan of an iris is generated and stored. During a user identification process (sometimes called the "verification process") a new iris scan is generated by obtaining a new reading from the user. The two scans, the prior one from registration and new reading just preformed, are compared. This, however, requires secure storage of iris scan information in a form which essentially allows reproduction of all the information from the original (registered) scan. Note, however, this is not a desirable property if one wants to protect the privacy of the user's biometric.

Conventional on-line applications secured through the use of biometric authentication typically are based on a "push" or "pull" data model. In both models, the first step is a user initialization, which occurs when a user's biometric ("UB"), and other information, is registered with the on-line server. After initialization, when a biometric identification of a user is required, a biometric authorization process is performed. At this time the user's biometric is read by a reader.

In the "push" model, the reader transmits (preferably via a private channel) the reading to an on-line server. The on-line server then verifies the validity of the reading based on the user's biometric in the server's database; and finally the server sends an authenticated acceptance or rejection message back to the reader.

In the "pull" model, the reader requests the biometric from the server, and the reader performs the verification steps after receiving the biometric over an authenticated and, preferably, private channel from the server.

In both cases, an authenticated channel is preferred for some communications between the on-line database and the reader. The authentication can also provide for a binding of a user's biometric with some form of authorization, as established by trust relationships between the reader and the on-line database. A secure on-line model is not always practical in mobile environments, such as military applications, and are often cost prohibitive since they require expensive wiring for connectivity or costly secure wireless devices and/or costly secure applications for wireless devices.

The term "on-line" is meant to refer to a system in which biometric identification information (or pattern recognition information in the case of inanimate objects) is stored on a server or some other central repository (e.g., database, etc.) of information used to identify more than one individual via a public or private communications network. For example, the central repository could contain information needed to identify all employees of a company.

The term "off-line" is meant to refer to a system which contains no stored remote biometric identification information (or pattern recognition information in the case of inanimate objects) is used during identification thereby not requiring connectivity to any remote server via any kind of communications network.

It should be noted that an off-line system which protects privacy is also applicable to on-line systems where information is stored in an on-line database instead of on storage cards. By using such a system in an on-line environment as disclosed in the present invention, security requirements imposed on a database are reduced. The present invention presents techniques which prevent a database manager from reading a biometric directly from the database or archives.

Designers of secure systems are often hampered by the lack of mechanisms to satisfy the various requirements of a secure key encryption management infrastructure. This infrastructure may have to deal with generation of both public and private encryption keys, authenticated dissemination of encryption keys, and the storage of encryption keys, as well as other concerns such as maintaining privacy of users and trusted circulation of user authorizations. The security of this infrastructure is often hindered by insufficient mechanisms to secure private encryption keys for users.

Currently, password encryption techniques are used in the art but these are based on the security of the user memorizing a sufficiently large and secret value. What is not known in the art is how to incorporate additional randomness from the private biometric into a password encryption. When one assumes that a user's biometric information has sufficient uncertainty, our technique also allows for the biometric to be used as a private key. Since there may not be sufficient entropy (i.e., uncertainty) in a user's biometric, our system allows us to augment password encryption with the entropy provided in a biometric.

Biometric systems based on a compare operation are not effective in providing this form of service. The present invention deals with the use of basic cryptographic authentication systems and basic error correcting mechanisms to generate a user identity verification template (IVT) that can be incorporated into a security infrastructure providing for user biometric identification.

The present invention includes methods which provide for user initialization to generate a user IVT for online and offline systems as well as a biometric authorization process. It further develops an IVT using error coding mechanisms (See e.g., [Berlekamp, Peterson, Weldon, Mac Williams, Sloane78]) for known techniques in the art) that provide for the correction of errors introduced into future readings of a user's biometric (UB).

The present invention includes methods in which an IVT or other stored biometric information is stored in a lossy (i.e., information losing) format of the UB. In another embodiment, the IVT or other stored biometric information is stored in a lossless format (i.e., no information is lost).

The present invention also does not require the use of a "compare operation" of a UB (e.g., UB-1) acquired at verification time with another biometric (e.g., UB-2) that was generated previously during a user's registration and initialization as an authorized user. By using an operation different than a compare operation new scalability and security feature are incorporated into the design of the present invention.

The present invention further involves methods which bind public and private user attributes to the UBs and includes methods in which biometrics provide an enabler to a cryptographic function by deriving a secret key for the cryptographic function from the biometric information as well as other private information such as personal identification numbers ("PINS") as well as other identification information.

However, even though the invention is used in an offline embodiment it can be used in the on-line embodiment as well. (See [Pare] for an on-line model that works with the present invention). Our embodiment is not limited to the off-line case.

A user in this invention is an entity usually associated with some role or capability though it does not necessarily have to include such associations. It is generally defined as an individual or set of individuals with some physical, preferably unique and hard to reproduce, characteristics.

Some examples are DNA, fingerprints, retinal, voice, iris, brain waves, handwriting, facial, and hand geometry. Our working example is an individual with a unique iris in which there will be a linking between an iris scan (also referred to in the art as an "iris code") to that individual user. For non-human entities the UB includes audio signals (e.g., RFID signals, etc.), video signals, other electrical signals, etc.

However, the invention is not limited specifically to individuals or iris scans, and may work with other types of biometrics. For example, it also allows for sets of individuals (e.g., via scans of the iris of several individuals) and other non-human objects. For instance, it may be a vehicle, smart-card or other object in which some component is sufficiently unique, is non-reproducible, and is linked to the object and can be read for secure identification. Collections of data points from facial scans of humans are also used.

A UB also may be identified by combining several unique factors (e.g., an iris and a fingerprint, etc.). It may also be a combination of biological and non-biological components such as a unique iris and a specific token with a unique tag.

It should be noted that each component may not be unique by itself but have uniqueness as a combination such as two or more biometrics (which by themselves are not unique) but define a unique entity (e.g., a UB) when all are taken into consideration. A unique UB will be different than any other biometric with a high probability. A user's biometric may also be a portion of a biometric component acquired (e.g., it may be only a portion of an individual's iris).

Users may have attributes associated with them. Some examples are privileges and role (title, position, etc.) of the individual, physical characteristics of the individual, etc. Some important attributes that are considered here are role and capability. The notions of roles and capabilities are known in the art of computer security, data security and network security (e.g., [Denning]).

Capabilities which describe authorizations are of particular interest because they may be related to the biometric based application. For instance, the biometric based application may be a door access and the capability assigned to a particular user is access to particular rooms.

User attributes may be directly or indirectly related to the user. An attribute may be something like a user's public encryption key which is used for some public key application, or an access control list. Indirect attributes may be a description of another object such as a token or other physical device that the user may need for identification (i.e., a necessary prerequisite to obtain a capability is a valid scan and a specific token). The token may be made unique by embedding a physical characteristic (see, e.g., [Nacaache]).

Another attribute of a token may be private memory it holds. It may be that there is a binding of a public vector related to private information stored in a token. Then using a zero-knowledge cryptographic technique or authentication techniques, the token can prove knowledge of the private information. These techniques for proving knowledge of secret information are known in the art of cryptography (See [Shamir86, Menezes] for examples).

Figure 3:
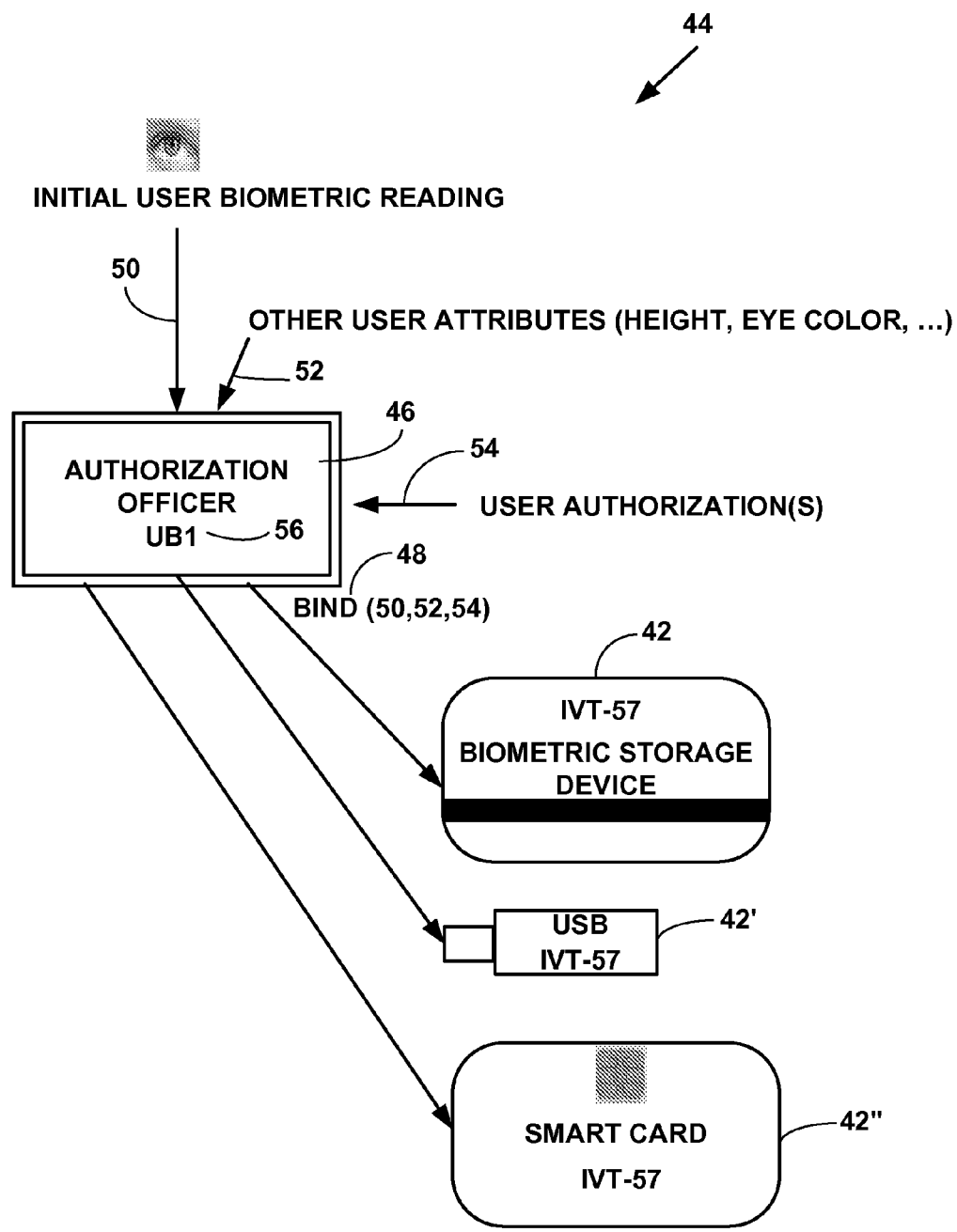
FIG. 3 is a block diagram illustrating an authorization's officer input into an off-line biometric storage device.

FIG. 3 is a block diagram 44 illustrating an authorization's officer input into an off-line biometric storage device 42.

The authorization officer's 46 role is to certify (e.g., authenticate or sign) a binding 48 between a user's biometric and some other attributes of the user. In FIG. 3 a security officer takes as input an initial user biometric 50, user attributes 52 and user authorizations 54 as a UB 56 and stores the necessary information as an identity verification template (IVT) 57 on an off-line biometric storage device 42. The IVT 57 is generated as described herein. The UB 56 is then discarded.

The authorization officer 46 is thereby a trusted third party attesting to an authenticity of the user's biometric 50 as well as to other user attributes 52. The authorization officer 46 plays a role that is similar to the Certification Authority (CA) in a public key hierarchy (see, e.g., [x509]), except that the authorization officer 46 binds 48 UBs 56 to user attributes, while a CA generally binds a public key to user attributes. It should be noted that the authorization officer(s) 46 may be one or more entities and may be incorporated into some security infrastructure as is known in the art.

Some examples authorizations are hierarchical but the present invention is not limited to such a structure. In present invention, a function, Sig(input), is a cryptographic authentication function that links an authentication of user input 50, 52, 54 to the authorization officer 46. That is, in a public key authentication Sig(input) is a digital signature input by the authorization officer 46 and in a private key authentication system it is the authenticator using a private key known by the authorization officer 46 and a reader.

Without loss of generality, assume throughout this patent application that Sig(input) is a public key encryption function and those knowledgeable in cryptographic system design will be able to use known mechanisms to use other types of authentication functions and systems. In an off-line system 36 of the present invention, the biometric authorization process cannot have a direct (on-line system 10) information retrieval mechanism.

We should note, however, that as with any off-line identification system, immediate revocation of user privileges is not possible. This limitation must be taken into consideration by the system designer during the development of the security architecture. For instance, a bad user list may be kept in cache and the local storage may be periodically refreshed. Such mechanisms are known in the security architecture state of the art and are known by those knowledgeable in the field. We now discuss the work-flow in the off-line biometric model.

User Initialization (Registration):

Returning to FIG. 3, a secure authorization officer 46 takes as input an initial biometric reading 50, called the user biometric template, authorization information 54 defining a set of privileges granted to the user by the authorization officer 46, and other user attributes 52. An off-line biometric output storage device 42 such as a magnetic strip card 42, smart card 42', USB flash drive 42", etc. is encoded with information which establishes a binding 48 between a UB 56 (and, possibly, other user attributes) and the user's authorization granted by the authorization officer 46. (See FIG. 3). Other information and bindings may also be included in the UB.

As is known in the art, a "magnetic strip card" 42 is a type of card capable of storing data by modifying the magnetism of tiny iron-based magnetic particles on a band of magnetic material on the card. The magnetic stripe, sometimes called a magstripe, is read by physical contact and swiping past a reading head. Magnetic stripe cards are commonly used in credit cards, identity cards, and transportation tickets. They may also include an RFID tag, a transponder device and/or a microchip mostly used for identification and access control.

A number of ISO standards, ISO/IEC 7810, ISO/IEC 7811, ISO/IEC 7812, ISO/IEC 7813, ISO 8583, and ISO/IEC 4909, define the physical properties of the card, including size, flexibility, location of the magnet stripe, magnetic characteristics, and data formats. They also provide the standards for financial cards, including the allocation of card number ranges to different card issuing institutions As is known in the art, a "USB flash drive" 42" or jump drive consists of a flash memory data storage device integrated with a USB (Universal Serial Bus) 1.1 or 2.0 or later interface. USB flash drives are removable and rewritable.

As is known in the art, a "smart card," 42"chip card, or integrated circuit card (ICC), is any pocket-sized card with embedded integrated circuits which can process data. There are two broad categories of smart cards. Memory smart cards include only non-volatile memory storage components, and perhaps some specific security logic. Microprocessor smart cards include volatile and/or non-volatile memory and microprocessor components. The smart card is made of plastic, generally PVC, but sometimes ABS or polycarbonate.

Figure 4:
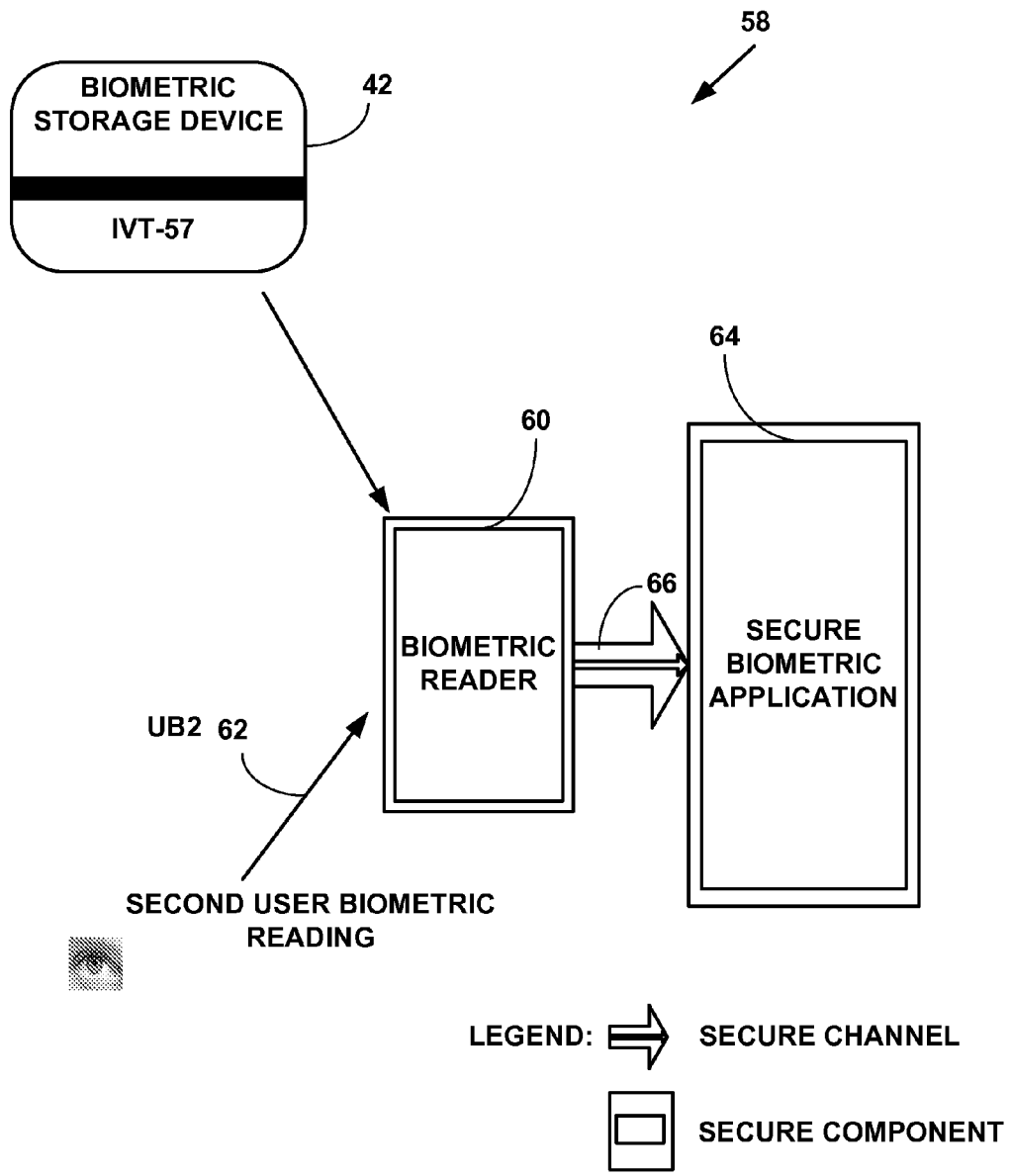
FIG. 4 is a block diagram depicting an off-line biometric authorization process.

Biometric Authorization Process:

FIG. 4 is a block diagram depicting an off-line biometric authorization process 58.

During a secure biometric authorization process an off-line biometric reader 60 takes as input the user's off-line biometric storage device 42 (e.g., magnetic strip card 42, smart card 42', USB flash drive 42", etc) and acquires the user's biometric 60. Given this information the user's attributes 54 can be obtained and linked to the authorization officer 46. Of particular interest is that capabilities for a secure biometric application 64 may need such information to determine how the secure biometric application 64 should function if the user is identified.

The information from the may now be transmitted to the secure application 64 or the biometric reader 60 informs the secure biometric application 64 of the validity (acceptability) of the user. In FIG. 4 the biometric reader 60 is secure and the communication 66 between reader 60 and application 64 is secure (i.e., authenticated and/or private). The security of the channel may also be protected by means other than cryptographic techniques, such as physical protections.

Note that the storage device 42 can be replaced by an authenticated transmission link to the authorization officer 46 (or its database 20', 22', 24') in the on-line system 10. The authentication (signature) in an online system 10 (FIG. 1) does not need to be stored but rather created at time of request. Thus, the mechanisms described in this embodiment allow for online biometric identification systems 10 as well.

Certain principles can be incorporated into the system disclosed in this embodiment: There is a binding between a user's biometric and a trusted authorization officer. There is a need for a scalable solution when privacy of a user's biometric must be protected in case a storage device is lost or stolen. The primary scalability issues are who must store private keys and how much storage must be provided on the cards.

One can note several off-line, as well as online, security architectures by determining who, if anyone, must hold a private key. Let us describe some models below where we discuss privacy of a user's biometric but similar techniques can be used to hide other information including: (1) a private key; (2) a secure token; (3) password protection; and (4) no keys or passwords.

Private Key in Reader:

If a reader has a private key to decrypt biometric information encrypted by the authorization officer 46 (and stored on the off-line biometric storage device 42 (e.g., smartcard, etc.)), then there will be no leakage of biometric information when a smart card is lost or stolen.

However, such a system is not scalable if the memory device has low storage capability and the application's architecture requires multiple readers (each with its own private key), because a separate encryption of the biometric is required for each reader.

FIG. 5 is a block diagram 68 illustrating encrypting an IVT 57 multiple times under different encryption keys 70.

FIG. 5 depicts a magnetic strip card 42 with limited memory storing multiple encryptions of the same IVT 57 but encrypted with different encryption keys 70. This technique, however, can be effective if there are few readers in the architecture. To be effective, this approach requires that the readers provide some form of protection for the reader's private key (e.g., FIPS PUB 140-1 standards etc.), because if the private key is stolen from the device, an adversary is able to read the biometric from any user's off-line storage device 42.

Secure Token:

A secure token with (direct or indirect) computational capability may store the private biometric information in a secure place in its memory. Preferably this memory is destroyed if tampered by unauthorized entities. The secure token has a capability to verify the reader through an entity authentication technique. Upon verification, the private information is transmitted to the reader.

Other mechanisms are possible. An authenticated channel may be established between the token and the reader using techniques known in the art of cryptography and data security and the information is transmitted via that channel. These and other techniques are known in the art of cryptography and data security (See e.g., [Schneier] and/or Menezes]).

Password-Protection:

Password protection can hide information stored on an off-line storage device 42 (such as the IVT 57 or UB 56 if it is stored) if the password has sufficient entropy. This approach is a scalable solution (e.g., using password encryption [PKCS5] to encrypt the biometric info with a user memorized password, etc.), if revealing a password to a reader is considered safe and the readers have a user password input mechanism.

Generally, password protection is considered insufficient, since it usually has low entropy and is therefore easily guessed. As a result [FIP PUB 190] recommends the combination of PIN/password and a secure token for user authentication when feasible [FIPS190].

However, it should be noted that though ineffective in some applications it is useful in some. Especially since it is a low cost mechanism. This mechanism for instance can be incorporated into a public key certificate mechanism in which the biometric is password protected in the certificate. The use of password protection to protect biometric information or to protect private information in a certificate is disclosed here.

No Keys or Passwords:

Potentially, this is the most scalable approach with minimal system component requirements for an off-line biometric system. Such biometric systems, as will be shown, are possible when the entropy in a biometric is large enough. Except for the secure token model, all the above require no special security requirements from the token. It just requires that the token has a storage capability.

As is known in the art, "entropy" is a measure of the uncertainty associated with a random variable. The term by itself in this context usually refers to the "Shannon entropy," which quantifies in the sense of an expected value, information contained in a message (e.g., a user biometric).

Shannon's entropy represents an absolute limit on the best possible lossless compression of any communication, under certain constraints: treating messages to be encoded as a sequence of independent and identically-distributed random variables, Shannon's source coding theorem shows that, in the limit, the average length of the shortest possible representation to encode the messages in a given alphabet is their entropy divided by the logarithm of the number of symbols in the target alphabet.

It should be noted that the off-line systems 36, 44, 58 discussed herein are also applicable to on-line systems 10 where information is stored in an on-line database 20', 22', 24' instead of on off-line biometric storage devices 42. By using the off-line mechanisms described in this embodiment in an on-line environment 10, the security requirements imposed on an on-line. database 20', 22', 24' are reduced where privacy restrictions on the information exist.

Off-Line Identification Scheme

An algebraic (N,K,D) code is set up such that it can remove enough errors to allow the off-line system 36 to recognize a legitimate user of an off-line biometric storage device 42 (e.g., smartcard but not someone else) using "bounded distance decoding." An (N, K, D) code is a code of N bit codewords (vectors) where K is a number of information digits and D is a minimum distance of a bounded distance code.

An error correcting code ("ECC") with rate K/N can correct $T=(D-1)/2$ errors. To allow for error correction of a UB, a K bit biometric is encoded into an N bit code vector, with N-K redundant (or check) digits. These are the dependency bits mentioned above.

In one embodiment, majority decoding is used as illustrated in Equation (1):

$$\text{Let vector}\{c_i\}=c_i,1,\|c_i,1,\| \ldots \|c_i,n,\| \text{ be the n-bit code vectors.} \quad (1)$$

As an example of majority decoding odd m vectors vector$\{c_i\}$, a majority decoder computes another vector Codeword as is illustrated in Equation (2):

$$\text{Codeword}=C1\|C2\| \ldots \text{Cn, where Cj=majority(c1, j,\ldots cm, j),} \quad (2)$$

where Cj is a majority of 0's or 1's of bit j from each of the vectors. Majority decoding is used primarily to get the best biometric reading possible, thus reducing a Hamming distance between successive final readings Codeword.

The description of an (N, K, D) error correcting code, preferably, with rate K/N>1/2, (using bounded distance decoding of up to (D−1)/2 errors), is provided to the authorization officer 46 and biometric readers 60. With [Daugman1, Daugman2, Daugman3], it should be noted that it was determined experimentally that an average Hamming distance between unrelated biometric iris scans is about 47 percent (i.e. about 962 out of 2048 bits), making a bogus iris scan too far from a targeted iris scan on the average.

Even if overlap in a distribution of the Hamming distances is considered of the same subject (e.g., an average of about 10 percent Hamming distance), and the distribution of Hamming distances of unrelated scans, the overlap occurs at around 21 percent, at negligible probabilities.

The technique of majority decoding introduced here ensures that each biometric vector, be that bogus or valid, will tend toward an "average" vector for the individual being scanned, thus moving the Hamming distance of a bogus scan (from a valid scan) closer to the statistical average of about 47 percent. These values are exemplary only and are not limiting to the scope of invention.

The invention is not limited to error correcting codes which use a binary alphabet. For instance, p-ary codes are known and the present invention allows for systems using such mechanisms. In these cases Hamming weights different and such methods can be modified to incorporate such codes. The invention is also not limited to linear codes though these are commonly used and bounded distance decoding is preferable but not required.

Off-line System Setup: The authorization officer 46 generates its public and private key encryption signature pair, and then disseminates its public key to the biometric readers 60. The system also sets up an algebraic (N,K,D) code.

Off-line User Initialization: To register, IM biometric scans 50 of length K are generated from the user. These IM vectors are put through a majority decoder to obtain the user's K bit biometric Biodigits. These scans (vectors) are similar to the iris code used in [Flom, Daugman1, Daugman2, Daugman3] and in fact the same process to generate an iris scan may be used. Techniques such as those presented by [Flom, Daugman1, Daugman2, Daugman3] may also be used to generate vectors of K bits (also called an iris code). Given the K information bits Biodigits a codeword IC—Biodigits∥Checkdigits is formed where Checkdigits are the check bits in the (N,K,D) code is defined in system setup. The check digits are one form of a "dependency vector" or IVT which will be computed for the biometric. The following four items may go on the off-line user biometric storage device 42 as is illustrated in Table 1:

TABLE 1

Name of the individual ("NAME").
Other public attributes ("ATT") such as the issuing center and a user's access control list.
Check digits ("Checkdigits") of the biometric
Sig(Hash(NAME, ATT, Biodigits ∥ Checkdigits)) where Sig(x) denotes the authorization officer's signature of x, and Hash( ) is a partial information hiding hash function [canetti] (e.g., Sig(Hash(.)) is a content-hiding signature) or a random oracle (See [BR]).

Off-line Biometric authorization process (verification): When a user presents an off-line biometric storage device 42, VM biometric readings 62 are independently generated for the user. Each reading results in a biometric vector, also called an iris code. These VM vectors are put through majority decoding to obtain the user's K bit biometric (UB) VBiodigits. Error correction is performed on the codeword VC=VBiodigits∥Checkdigits to obtain the corrected biometric Nbiodigits. The signature Sig(Hash(NAME, ATT, NBiodigits Checkdigits)) is then verified against the data from the IVT 57 on the off-line biometric storage device 42. Successful signature verification implies the user passed the identification step. Other information may be incorporated and signed (authenticated).

There may be checkdigits for other user characteristics 52 (e.g., retinal, voice, etc.), from other individuals (e.g., scans from other individuals (e.g., if two people are needed for authorization then both biometrics checkdigits for both individuals can be incorporated) Similarly, biometrics for inanimate objects may be incorporated. Also it should be noted other biometric templates such as biometric codes, rather than check digits, may be incorporated (e.g., biometric systems which use a compare). It is not the intent of this example that only checkdigits be used or limiting to one biometric characteristic.

The above process is exemplary. Instead of a signature one may use a private key authentication systems (See [Schneier]) and as described earlier a different type of error correcting mechanism. The incorporation of an information hiding hash (or random oracle) is for the purpose of protecting the private input (e.g., Biodigits) to the signature function from being leaked since signature may leak their inputs. When this property is not needed then such additional complexity of incorporating the hash function (random oracle) is not necessary. If cryptographic authentication is not needed then Sig field may be omitted or preferably a hash (unkeyed) of the values may be used instead. Moreover, the authentication field may be embedded into the check digits.

It should also be noted that majority decoding may not be necessary especially if one can obtain an error free reading. Observe that the same technique can be used for online systems. Instead of putting the information on a card this information may be transmitted at the time the biometric authorization process needs the information. Observe using similar techniques both push and pull models are possible. The public attributes in the above may also include ciphertext of encrypted information which is private. Such information is encrypted such that the reader can obtain the decrypted information. Throughout this embodiment we will assume that the field ATT contains public information and ciphertext of private information.

Biometrics as an Enabler: If the biometric has sufficient entropy, than the biometric itself can be used as a key. In fact, the biometric becomes a key for encrypting other private keys and private information. Thus, biometrics can be an enabler of cryptographic functions, if there exists sufficient entropy in the biometrics.

Cryptographic applications can be enabled through biometrics, since biometrics can hide private information such as keys. It is worthwhile to encrypt other valuable information, such as cryptographic keys (Keys) such as the user's application keys for the application, private attributes (Private) including private access control lists, and other biometric information (Bio) including physical descriptions (e.g., Brown hair, Hazel eyes, 5'11", 200 lbs.).

There, of course, is concern that a biometric is a lifetime key that cannot be revoked easily. Therefore, biometrics may be augmented using passwords, PINs, etc., with biometric entropy, in essence taking multiple sources with weak entropy to produce a key with a larger entropy. We included a PIN in this protocol to allow the user to add entropy into the final key. This addition is especially important when the privacy assumption may be in question.

Now, instead of a signature as in the previous biometric, the following encryption illustrated in Equation (3) is encoded for each application A (where KA is application A's private key and PINA is the user's PIN for application A). Note that the signature does not need to be inside the encryption but it is preferred for security reasons.

$$\text{New item enc}_A = \text{ENC}([\text{Hash}(K_A, \text{PIN}_A, \text{Biodigits})], \\ (\text{Keys}, \text{PrivateBio}, \text{Sig}(\text{msg})), \quad (3)$$

where Sig(msg)=Sig(NAME, ATT, Keys, PrivateBio, Hash (Biodigits∥Checkdigits))) and [Hash($K_A$, $PIN_A$, Biodigits] is encryption key.

Off-line Biometric authorization process (verification): When a user presents an off-line biometric storage device 42, VM biometric readings 62 are independently generated for the user. Each reading results in a biometric vector, also called an iris code. These VM vectors are put through majority decoding to obtain the user's K bit biometric (UB) VBiodigits. Additional error correction is performed on codeword VB=VBiodigits∥CheckDigits to obtain the corrected biometric NBiodigits. The system computes key Hash(K A, PIN A, NBioDigits) which is be used to decrypt encA. The signature may now be verified. Successful signature verification implies the user passed the identification step. A universal one way hash function [NY] as known in the art of cryptography is the preferable choice for the Hash function.

There are other techniques known in the art for composing a key, with the pin and the =biometric vector BioDigits, for instance, it can be carried out by a universal one way function keyed by KA with input being the PINA, BioDigits.

The above is private key based. However the technique is not limited to such encryption. The encryption can be public key based using the public key rather than the private key. Also observe that the key (i.e., Hash($K_A$, $PIN_A$, NbioDigits)) generated with the biometric does not need to be used for encryption but it may be used directly for other purposes (as the application's key). The intent of the encryption in the preferred description is exemplary but it is very useful in particular when an application's keys must have special form such as an RSA key rather than being random.

Adding Private attributes: The system includes public attributes as components incorporated into the off-line biometric storage device. However, private user attributes 52 can also be incorporated as well. Private information may be encrypted in a manner in which the reader's private decryption key can be used to decrypt the information. Of course this private information, or the ciphertext, should also be authenticated with the other information on the off-line biometric storage device. This however is not always a scalable solution.

Password encryption can also be used in which the user must supply a password which is used to decrypt the biometric information. Another mechanism is using the biometric as an enabler mechanism. The private information is incorporated in the same manner as the PrivateBio.

Offline Biometric Implementations: For (N,D,K) error correcting codes, BCH codes, which are well known in the art of error correcting codes theory and information theory, can be used. With BCH codes for a suitable length can be generated. See [ShuLin, Rhee, BerleKamp, MacWilliamsSloane78, PetersonWeldon] for discussions on the implementation of BCH codes. As is known in the art, BCH codes are a multilevel cyclic variable-length digital error-correcting code used to correct multiple random error patterns.

Bounded distance decoding is allowed but not required which enforces that only a limited number of changes (modifications) are allowed to be made during decoding, This may be done in numerous ways, the preferred method is that during decoding when determining error-locations only an allowed number of changes are permitted. This may be done in the same process as [Rhee Section 7.5.2] which describes the "computation of error-location number" in the decoding step by computing reciprocal of the roots of the error locator polynomial.

The present invention is not limited to binary codes or BCH codes. Many other types of error correcting systems will work. The primary process includes a "lossy transformation" of the biometric and/or other biometric data with error correcting codes obtained during a registration process resulting in data called "dependency data," or "dependency vector." The dependency vector is stored as an WT 57 with possibly other dependent information (e.g., authenticators of stored information, public values, etc.).

As is known in the art, "lossy transformation" is a data compression method which discards (i.e. loses) some of the data and that decompressing the data yields content that is different from the original, though similar enough to be useful in some way.

At a later time verification is performed by acquiring the information generated at registration as well as a newly acquired biometric scan 62 and other information, thereby validating the link between the biometric and the information provided at registration. In one application of this process, registration includes a lossy transformation of the biometric and cryptographic authentication of the biometric. Instead of an authenticator, a hash may be used in some cases or it may even be omitted.

The link may also express other relationships such as a third party (e.g., a CA) validating the relationship between the biometric and dependency data information digits. An example is the information digits of a BCH codes. Other functions are non-linear functions of the information digits are also possible as well. These functions may also come from those which come from the art of error correcting codes. Furthermore, the dependency digits can be linear or non-linear functions of the biometric and other data as well. In addition with error correcting codes, it is possible to shorten the check digits, that is allow them to become a removed part of the dependency vector.

Such schemes are known in the art [Berlekamp, DavidaReddy72] as puncturing an error correcting code and can be used in schemes where one or more part of the check digits are used in one step of the decoding process and the remainder part[s] of check digits are used in the remainder of the decoding process.

As an example, the biometric cited in [Daugman2 and Daugman3], includes an iris code of length 2048 bits. For this iris code, the expected number of errors between successive readings is about 10 percent, or about 205 errors. With majority decoding eleven readings for an individual are used and this reduces the effective distance between successive final user biometrics to about one on the average. This reduces a demand on the error correcting code used. Assuming that at most three errors will be present, then a shortened BCH code (See ShuLin, Peterson and Weldon, Rhee) of length 2048+36 bits (i.e., 36 check digits) can correct the three errors in the final user biometric acquired at verification time. This is an example.

Readings of the biometric are subject to technology changes, and for the iris code or other biometrics the actual errors between successive readings may vary. It is recommended that the total number of check digits (the dependent vector), as a percent of the length of error correcting code, N, be less than 50 percent. For example, one can set the recommended number of check digits to be no more than 35 percent of the code length N.

There are many hash functions which have been developed for the use in cryptographic and other applications (See [Menesez] for various implementations of hash functions) with the most commonly used hash functions for cryptographic applications today are SHA-1 [FIPS180-1] and MD-5 [MD5]. Both of these are usable in this invention but the invention is not limited to only these. It should be noted that cryptographically secure hash functions are used for digital signature algorithms as well.

In the off-line system, both public and private key encryption are incorporated. For private key encryption, DES is the preferred mode of operation for this invention (See [FIPS 46-2] for standards on this implementation). However, the present invention is not limited to DES and other encryption and security schemes can also be used including all proposed new government standards of AES including key lengths larger than that of DES. In our system with DES, when [Hash(KA, PINA, Biodigits] is used as the encryption (similarly, decryption) key then only the lower order 56 bits are used.

However other set of bits may be used as well. Moreover, other DES modes of operation may be used such as those described in [FIPS 81]. For public key encryption, our recommended algorithm is RSA but others may be used such as the El Gamal encryption (See [Menesez] for implementations). There may also be a combination of both public and private key technologies in order to allow for efficient implementations. In such schemes, a session key is transferred via public key mechanisms such as RSA encryption or a Diffie-Hellman Key exchange. The session key is then used with a private key encryption mechanism to encrypt the data (See [PEM] for an example).

For the public key signature the preferred implementation is the digital signature algorithm (DSA) [FIPS186]. Other systems may be used as well such as RSA signatures such as is used in [PEM]. The system is not limited to the type of digital signature algorithm that is used. Depending on the security model, private key authentication may be used instead though this may not allow for scalable operations.

FIG. 6 is a flow diagram illustrating a Method 72 of biometric identification. At Step 74, a first user biometric (UB) is generated from a plural data bits of information of physical biometric information on an application on a first server network device on an biometric system including one or more server network devices each with one or more processors and one or more biometric scanners each with one or more processors used to collect physical biometric information from a human or non-human object. At Step 76, authorization information is encoded via the application into the generated first UB defining a set of privileges granted to the human or non-human objects for a security infrastructure. At Step 78, an Identification and Verification Template (IVT) is generated cryptographically from the generated and encoded first UB via the application. The IVT is generated with a lossy transformation of information stored in the generated and encoded first UB and error correcting codes. The generated IVT does not include complete information from the generated and encoded first UB but does allow for verification of the human or non-human object when the generated IVT is accessed a later time. At Step 80, the generated and encoded first UB is discarded. At Step 82, the generated IVT is stored on an on the off-line biometric storage device for use within the security infrastructure.

Method 72 is generated with one exemplary embodiment. However, the present invention is not limited to this embodiment and other embodiments may also be used to practice the invention.

In such an exemplary embodiment, at Step 74, a first user biometric (UB) 56 is generated from a plural data bits of information of physical biometric information 50 on an application 64 on a first server network device 20 with one or more processors on an biometric system 10 including one or more server network devices 20, 22, 24 each with one or more processors and one or more biometric scanners 26, 28, 30, 32 each with one or more scanners used to collect physical biometric information from a human or non-human object.

At Step 76, authorization information is encoded cryptographically via the application 64 into the generated first UB 56 defining a set of privileges 54 previously granted to the human or non-human objects for a security infrastructure.

At Step 78, an Identification and Verification Template (IVT) 57 is generated cryptographically from the generated and encoded first UB 56 via the application 64 using the techniques described above. The IVT 57 is generated with a lossy transformation of information stored in the generated and encoded first UB 56 and error correcting codes as described above. The generated IVT 57 does not include complete information from the generated and encoded first UB 56 but does allow for verification of the human or non-human object when the generated IVT 57 is accessed a later time.

At Step 80, the generated and encoded first UB is discarded. It is not necessary to store or retrieve the generated and encoded first UB 56 to verify an identity of the human or non-human object that generated the physical biometric information 50 with the current invention. Only the IVT 57 is necessary and the first UB 56 is not stored anywhere on any device or off-line biometric storage device 42 in the system 10. In another embodiment, the first UB 56 is securely stored on a network device 12, 14, 16, 20, 22, 24 and/or off-line biometric storage device in the system 10.

At Step 82, the generated IVT 57 is stored on an on the off-line biometric storage device 42, 42', 42" for use within the security infrastructure.

Since the IVT 57 does not include all the physical biometric information 50 of human or non-human object, it cannot be used alone to falsely "verify" an identity of the human or non-human object in system 10 if the off-line biometric storage device 42 is lost and/or stolen. A second UB 62 must be obtained from the human or non-human object and used with the IVT 57 to verify an identity of the user in system 10. The second UB 62 must include the same physical biometric information as the first UB 50 to allow verification with the generated IVT 57.

In another embodiment, the off-line biometric storage device is a smart phone 16 or a tablet computer 12.

In one embodiment, the generated IVT is encrypted one or more times on the off-line biometric storage device 42, 42', 42" (e.g., FIG. 5).

FIG. 7 is a flow diagram illustrating a Method 86 of biometric identification. At Step 88, a request is received on the application on the first server network device to verify an identity of the human or non-human object. At Step 90, a second user biometric (UB) is generated for the human or non-human object with the application on the first server network device. At Step 92, the IVT stored on off-line biometric storage device is retrieved with the application on the first server network device on the biometric system. At Step 94, verifying cryptographically an identity of the human or non-human object is verified using the generated second UB and the retrieved IVT without comparing the generated first UB and the second UB.

Method 86 is generated with one exemplary embodiment. However, the present invention is not limited to this embodiment and other embodiments may also be used to practice the invention.

In such an exemplary embodiment, at Step 88, a request is received on the application 64 on the first server network 20 device to verify an identity of the human or non-human object.

At Step 90, a second user biometric (UB) 62 is generated for the human or non-human object with the application 64 on the first server network device 20.

At Step 92, the IVT 57 stored on off-line biometric storage device 42, 42', 42''' is retrieved with the application 64 on the first server network device 20 on the biometric system 10.

At Step 94, an identity of the human or non-human object is verified cryptographically using the generated second UB 62 and the retrieved IVT 57 without directly comparing the retrieved IVT 57 and the second UB 62.

In one embodiment, Step 94, includes generating a lossy transformation of the second UB 62 to create a lossy second UB with error correcting codes and generating a cryptographic authentication of the lossy second UB and cryptographically comparing the generated cryptographic authentication of the lossy second UB to the retrieved IVT using the methods and equations described above. However, the present invention is not limited to these steps at Step 90 and other embodiments can be used to practice the invention.

A biometric based identification and authorization for a collected physical biometric for a security infrastructure is presented. The biometric identification and authorization is achieved with an identity verification template (IVT) generated from a User Biometric (UB) collected from a human or non-human object and stored on an biometric storage device (e.g., a magnetic strip card, smart card, Universal Serial Bus (USB) flash drive or a Radio Frequency Identifier (RFID) device, etc.). The generated UB is discarded. The IVT does not contain complete information UB but allows for accurate verification of the human or non-human object when another UB is generated for the human or non-human object at a later time.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

It should be understood that the architecture, programs, processes, methods and It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for uniquely identifying a user via biometric analysis, comprising:
    generating a first user biometric (UB) from a plurality of data bits of information of physical biometric information with an application on a first server network device with one or more processors on an biometric identification system including a plurality of server network devices each with one or more processors and one or more biometric scanners each with one or more processors used to collect physical biometric information from a human or non-human object;
    encoding cryptographically authorization information via the application into the generated first UB defining a set of privileges granted to the human or non-human objects for a security infrastructure;
    generating cryptographically an Identification and Verification Template (IVT) from the generated and encoded first UB via the application with a lossy transformation of information stored in the generated first UB and error correcting codes, wherein the generated IVT does not include complete information from the generated and encoded first UB but does allow for verification of the human or non-human object when the IVT is accessed a later time;
    discarding the generated and encoded first UB; and
    storing the generated IVT on an off-line biometric storage device for use within the security infrastructure.

2. A non-transitory computer readable medium having stored therein a plurality of instructions for causing one or more processors to execute the steps of:
    generating a first user biometric (UB) from a plurality of data bits of information of physical biometric information with an application on a first server network device with one or more processors on an biometric identification system including a plurality of server network devices each with one or more processors and one or more biometric scanners used to collect physical biometric information from a human or non-human object;
    encoding cryptographically authorization information via the application into the generated first UB defining a set of privileges granted to the human or non-human objects for a security infrastructure;
    generating cryptographically an Identification and Verification Template (IVT) from the generated and encoded first UB via the application with a lossy transformation of information stored in the generated first UB and error correcting codes, wherein the generated IVT does not include complete information from the generated and encoded first UB but does allow for verification of the human or non-human object when the IVT is accessed a later time;
    discarding the generated and encoded first UB; and
    storing the generated IVT on an off-line biometric storage device for use within the security infrastructure.

3. The method of claim 1, wherein the physical biometric information includes an iris scan or a portion of an iris scan of the human.

4. The method of claim 1 wherein the physical biometric information includes a facial scan of the human.

5. The method of claim 1 wherein the physical biometric information includes a finger print scan of the human.

6. The method of claim 1, further comprising:
    storing the generated and encoded first UB on the off-line biometric storage device.

7. The method of claim 1 wherein the off-line biometric storage device includes a magnetic strip card, smart card, Universal Serial Bus (USB) flash drive or a Radio Frequency Identifier (RFID) device.

8. The method of claim 6 wherein the RFID device includes an RFID tag or an RFID sensor.

9. The method of claim 1 wherein the off-line biometric storage device includes a computer readable medium on a smart phone or a tablet computer.

10. The method of claim 1 wherein the one or more server network devices include on-line server network devices connected to a communications network or off-line servers not connected to a communications network.

11. The method of claim 1 wherein the generated and encoded first UB is discarded and not stored on the biometric identification system.

12. The method of claim 1 wherein the physical biometric information is collected with a camera component on a smart phone or tablet computer.

13. The method of claim 1 wherein the first server network device is connected to a communications network.

14. The method of claim 1 further comprising:
    encrypting the generated IVT on an off-line biometric storage device one or more times with one or more different encryption keys.

15. The method of claim 1 further comprising:
    receiving a request on the application on the first server network device to verify an identity of the human or non-human object;
    generating a second user biometric (UB) for the human or non-human object with the application on the first server network device;
    retrieving the IVT stored on off-line biometric storage device with the application on the first server on the biometric identification system; and
    verifying cryptographically an identify of the human or non-human object using the generated second UB and the retrieved IVT without directly comparing the second UB and the retrieved IVT.

16. The method of claim 15 wherein the verifying cryptographically step includes:
 generating a lossy transformation of the second UB with error correcting codes to create a lossy second UB;
 generating a cryptographic authentication of the lossy second UB; and
 comparing cryptographically the generated cryptographic authentication of the lossy second UB to the retrieved IVT.

17. A system for uniquely identifying a user via biometric analysis, comprising in combination:
 means for generating a first user biometric (UB) from a plurality of data bits of information of physical biometric information with an application on a first server network device with one or more processors on an biometric identification system including a plurality of server network devices each with one or more processors and one or more biometric scanners used to collect physical biometric information from a human or non-human object;
 means for encoding cryptographically authorization information via the application into the generated first UB defining a set of privileges granted to the human or non-human objects for a security infrastructure;
 means for generating cryptographically an Identification and Verification Template (IVT) from the generated and encoded first UB via the application with a lossy transformation of information stored in the generated first UB and error correcting codes, wherein the generated IVT does not include complete information from the generated and encoded first UB but does allow for verification of the human or non-human object when the IVT is accessed a later time;
 means for discarding the generated and encoded first UB;
 means for storing the generated IVT on an off-line biometric storage device for use within the security infrastructure;
 means for encrypting the generated IVT on an off-line biometric storage device one or more times with one or more different encryption keys;
 means for receiving a request on the application on the first server network device to verify an identity of the human or non-human object;
 means for generating a second user biometric (UB) for the human or non-human object with the application on the first server network device;
 means for retrieving the IVT stored on off-line biometric storage device with the application on the first server on the biometric identification system; and
 means for verifying an identify of the human or non-human object using the generated second UB and the retrieved dependency vector without directly comparing the retrieved IVT and the second UB.

* * * * *